United States Patent
Rodkey et al.

(10) Patent No.: US 7,519,165 B1
(45) Date of Patent: *Apr. 14, 2009

(54) METHOD FOR PROVIDING DIGITAL NOTIFICATION AND RECEIVING RESPONSES

(75) Inventors: Ryan Scott Rodkey, Sugar Land, TX (US); John Frank Rodkey, Jr., Missouri City, TX (US); David Lynn Hickey, Rosharon, TX (US); Darren Lynn Ross, Sugar Land, TX (US); Ronald Frank Ramsey, St. Petersburg, FL (US)

(73) Assignee: Techradium, Inc., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/960,203

(22) Filed: Dec. 19, 2007

Related U.S. Application Data

(63) Continuation-in-part of application No. 11/522,723, filed on Sep. 18, 2006, which is a continuation-in-part of application No. 11/117,594, filed on Apr. 28, 2005, now Pat. No. 7,130,389.

(51) Int. Cl.
*H04M 1/64* (2006.01)

(52) U.S. Cl. .................. 379/88.12; 379/88.23; 379/252; 370/465; 455/412.2; 704/235; 705/52; 709/204

(58) Field of Classification Search .................. 370/465; 379/88.12, 88.23, 252; 704/235; 705/52; 709/204; 455/414.2
See application file for complete search history.

(56) References Cited

U.S. PATENT DOCUMENTS

| | | | |
|---|---|---|---|
| 6,442,241 B1 | 8/2002 | Tsumpes |
| 6,463,462 B1 | 10/2002 | Smith |
| 6,496,568 B1 | 12/2002 | Nelson |
| 6,643,355 B1 | 11/2003 | Tsumpes |
| 6,678,358 B2 | 1/2004 | Langsenkamp |
| 6,697,477 B2 | 2/2004 | Fleischer |
| 6,816,878 B1 | 11/2004 | Zimmers et al. |
| 6,871,214 B2 | 3/2005 | Parsons |
| 6,912,462 B2 | 6/2005 | Dodrill |
| 6,931,415 B2 | 8/2005 | Nagahara |
| 6,973,166 B1 | 12/2005 | Tsumpes |
| 6,999,562 B2 | 2/2006 | Winick |
| 7,042,350 B2 | 5/2006 | Patrick |
| 2002/0032020 A1 | 3/2002 | Brown |
| 2002/0159570 A1 | 10/2002 | Langsenkamp |

(Continued)

*Primary Examiner*—Gerald Gauthier
(74) *Attorney, Agent, or Firm*—Buskop Law Group, PC; Wendy Buskop

(57) ABSTRACT

A method to provide a digital notification and response to groups of users comprising storing user contact data for at least one group of users, user selected priority information, and user selected grouping information in a dynamic information database, and using an administrator interface to form at least one message. An administrator initiates transmission of the message simultaneously to a first group of user contact devices for all users in the at least one group of users, then simultaneously to a second group of user contact devices, using the user selected priority information. The administrator interface is used to ensure each user is contacted on the first group of user contact devices before the second group of user contact devices. Responses are received from the user contact devices indicating the devices that received the message and when insufficient user contact device information exists to contact the user contact devices.

37 Claims, 3 Drawing Sheets

U.S. PATENT DOCUMENTS

| | | |
|---|---|---|
| 2005/0013417 A1 | 1/2005 | Zimmers et al. |
| 2005/0242944 A1 | 11/2005 | Bankert |
| 2005/0272368 A1 | 12/2005 | Langsenkamp |
| 2005/0272412 A1 | 12/2005 | Langsenkamp |
| 2007/0096894 A1 | 5/2007 | Lemmon |

# METHOD FOR PROVIDING DIGITAL NOTIFICATION AND RECEIVING RESPONSES

CROSS REFERENCE TO RELATED APPLICATIONS

The present patent application is a continuation-in-part application which claims the benefit, under 35 USC § 120, of prior non-provisional application Ser. No. 11/522,723, filed Sep. 18, 2006, which claims the benefit of application Ser. No. 11/117,594, filed Apr. 28, 2005, now issued U.S. Pat. No. 7,130,389, the entirety of which are incorporated herein by reference.

FIELD

The present embodiments relate to a method for providing a digital notification to groups of users having contact devices and receiving responses from the user contact devices.

BACKGROUND

A need exists for a method for automating the delivery of messages and the collection of message responses implemented through messaging devices of multiple types. A need exists for a digital information and response method to bridge the gap between the government and the public, businesses and employees, and other groups of users, for communication without being limited to one device.

A need exists for a method of communication from an administrator which reaches all possible forms of communication devices, so that all members of the public can be reached.

A need exists for a method that can transmit a message in multiple languages to multiple user devices to inform the public of emergency situations, and general information simultaneously.

A need exists for a method that can transmit messages to multiple user contact devices and rapidly receive responses confirming the receipt of the messages or the failure to contact one or more designated user contact devices.

The present embodiments meet these needs.

BRIEF DESCRIPTION OF THE DRAWINGS

The detailed description will be better understood in conjunction with the accompanying drawings as follows.

Figure 1:
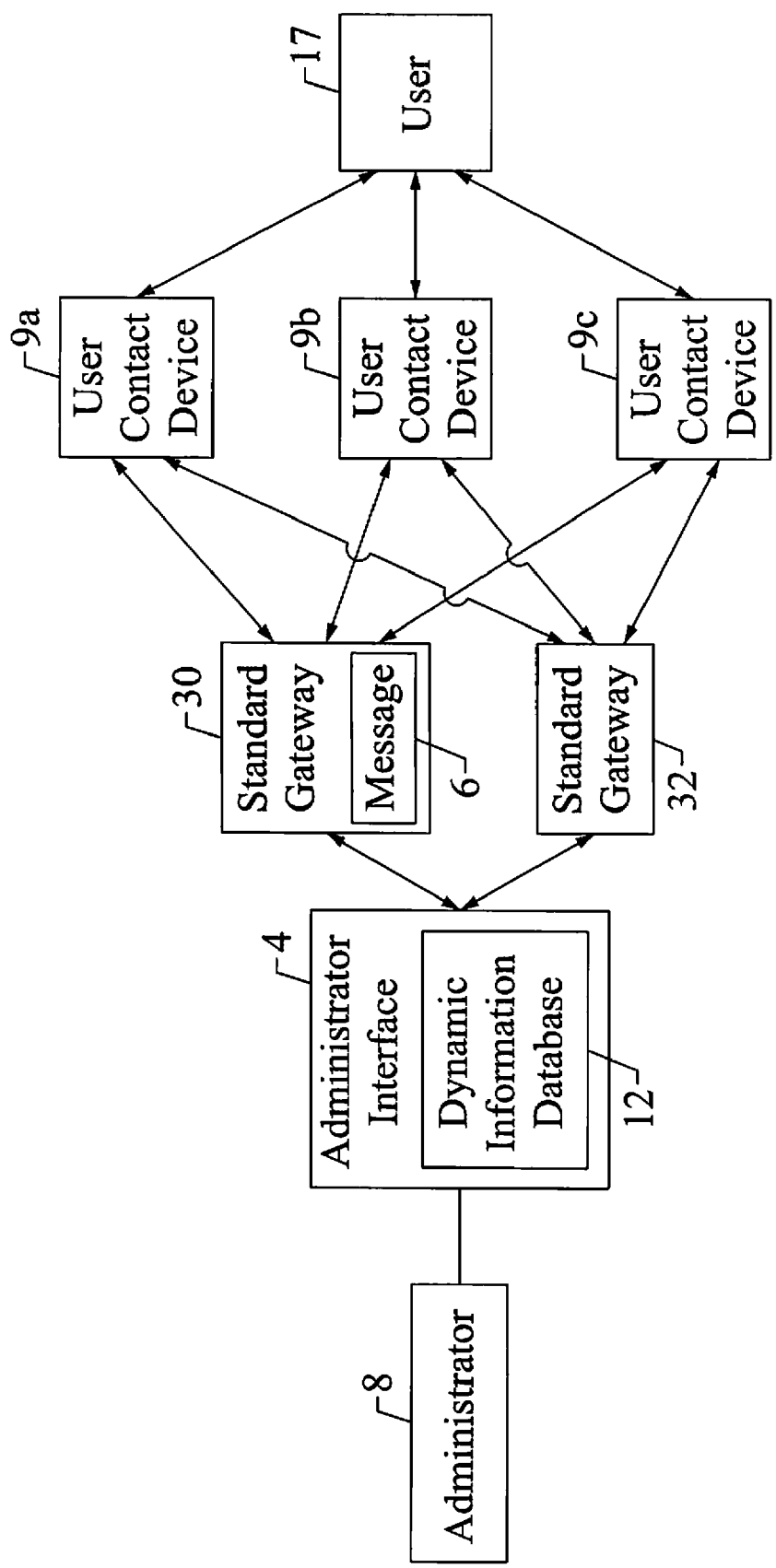
FIG. 1 depicts a representation of an embodiment of a digital notification and response system useable with the present method.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to a method for providing digital notification and responses to groups of users and receiving responses from one or more of the users' contact devices. The method can provide immediate response information or emergency information, as well as general information.

The present embodiments relate to the creation and delivery of messages, and to the routing, and to the verification and collection of responses to the messages. The method is universally applicable to, and independent of, the type of messaging system and device selected by the message recipients.

The present embodiments relate to the simultaneous transmission of a message in multiple languages to a user device, wherein the recipient of the message can select the language for transmission to the recipient.

The present embodiments provide a timely and uniform manner to contact numerous users through numerous user contact devices, such as cellular telephones, LED displays, land phone lines, e-mail addresses, fax machines, pagers, digital displays, handheld wireless devices such as PDAs and Blackberries, instant messaging devices, TTY/TDD devices, webpages, and other similar devices.

The present method can be used to contact users in the case of emergency conditions, such as storms or fire, and in the case of informational situations, such as school closings. Additionally, terrorist threat levels can be transmitted using the present method.

The method can be used to advise office building superintendents and users in buildings, such as high rise office buildings, concerning building condition updates, parking garage conditions, disabled vehicle conditions, cars with headlights that have been left on, and similar situations.

The present method can be used within the sports industry, such as to facilitate children's soccer games or Major League Baseball games. The method can be used to update fans regarding changed game times, or weather conditions that affect a game start. The method can also be used to update the status of wins and losses on a "real time" basis to user contact devices of fans and parents.

The present embodiments provide a method that is capable of high speed notification and response, in which information is accessed and stored in a dynamic information database. The method can be used to contact users automatically when specific conditions arise, or to contact users when initiated by an administrator. The method can be contact a large number of users in a systematic manner, based upon predetermined priorities.

The method can include receiving responses from contacted users to confirm receipt of messages, failure to receive messages, or indicating that insufficient user contact device information exists to contact one or more user contact devices.

The present embodiments can be used save lives by notifying large groups of individuals concerning very dangerous situations quickly, through multiple different contact devices. The method can be used to stop rumors or erroneous information indicating that a situation is safe. This method can prevent panic and chaos, by sending a consistent message to all users.

The embodied method provides other benefits, such as non-emergent, general information updates. For example, a message can be sent, such as "bring a flower to your teacher tomorrow because it is her birthday," to all parents of students of a second grade teacher.

The present method includes storing in a dynamic information database user contact data for at least one group of users. Each user within the group of users has information relating to at least one user contact device. The user contact data can include an user name, address, phone number, user device address, social security number, account code, and combinations thereof.

Groups of users can include police departments, a commercial property manager, companies, parents of children, fire departments, school systems, adults, security companies, donors, utility customers, one or more branches of the military, trade show attendees, voters, parishioners, union organizations, such as the United Auto Workers Union, union members, other similar groups and individuals, and combinations thereof.

User contact devices can include handheld wireless devices, cellular telephones, land phones, e-mail addresses, fax machines, pagers, digital displays, such as a television, LED displays, such as a traffic display or a banner display, webpages, TTY/TDD devices, instant messaging devices, and combinations thereof.

The present method also includes storing user selected priority information, which includes a contact order for each user contact device, in the dynamic information database. It is contemplated that the user selected priority information can indicate which user contact devices of a specified user are to be contacted before other user contact devices of the specified user. For example, a user could indicate that his or her work telephone should be contacted using the present method before his or her home telephone is contacted.

Additionally, user selected grouping information, which includes at least one group associated with each user contact device, is stored in the dynamic information database. Groups associated with each user contact device can include any type of grouping, such as all consumers of electric power from Reliant Power Company in Houston Tex., all residents within a flood zone, all users falling within a certain age range, or other similar groupings.

The dynamic information database can be a SQL™ database, a MySQL™ database, an Oracle™ database, another similar industry standard database, or combinations thereof.

In an embodiment, the dynamic information database can be encrypted. The dynamic information database can have one or more encryption keys, such as a 1024 bit AES encryption key.

The present method can include, in an embodiment, installing the dynamic information database on a solid state hard drive server.

The method then includes using an administrator interface to form at least one message. The one or more messages can include prewritten or prerecorded messages stored in the dynamic information database for subsequent use by the administrator. The messages can also include custom messages for any condition or situation.

The present method can include, in an embodiment, creating real time customized or predefined messages for transmission by an administrator.

In an embodiment, the message can have a designation indicating the priority of the message, such as low priority, general priority, significant priority, high priority, and severe priority.

In another contemplated embodiment, the present method can include uploading a document to a website, then using the dynamic information database and the administrator interface to form and transmit a message that includes a website link to the document to at least one group of users.

In a contemplated embodiment, the message can include activation of an audio alarm, such as a tone, bell, siren, spoken audio message, or other similar audio alarms, a visual alarm, such as a blinking light or visual text message, or combinations thereof.

It is also contemplated that a designated ring tone can be used for each message. The designated ring tone can be selected by the user, the administrator, or the manufacturer of the contact device.

The administrator interface can be in communication with a local area network, a wide area network, a virtual private network, an asynchronous transfer mode network, a synchronous optical network, a call center interface, a voice mail interface, a satellite network, a wireless network, a WIFI network or a WiMax network, other similar interfaces and networks, or combinations thereof. An administrator in communication with a processor initiates transmission of the message simultaneously to a first group of user contact devices, then simultaneously to a second group of user contact devices, using the user selected priority information. After the transmission of the message to the user contact device, the administrator interface can receive a response from the user contact device.

An administrator can be a person, a computer, a digital notification and response system, an analog emergency notification system, an application programming interface, a mass notification system, such as a public notification system, a telephone emergency alert system, an e-mail emergency alert system, an instant messaging alert system, or a streaming media alert system, which can be video or another digital content stream, or any combinations thereof.

An application programming interface can control the administrator interface and provide additional code or instructions to the administrator interface for creating and transmitting messages to user contact devices. The instructions can be XML code, a flat text file, or similar code. The application programming interface can receive information from a tool developed by a third party company and deploy the use of the tool.

In an embodiment, computer instructions in the dynamic information database can be used to classify one or more administrators to have restricted access to information in the dynamic information database, the administrator interface, or combinations thereof. This embodiment can be of particular use when it is desirable to allow agents of administrators to access the dynamic information database, or when multiple administrators responsible for separate groups of users use a single notification and response system to transmit messages to their specific groups of users without accessing information on user groups for which they are not responsible.

It is contemplated that the messages can be transmitted through at least two industry standard gateways simultaneously. Industry standard protocols can include a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

The administrator interface is then used to ensure that each user is contacted on the first group of user contact devices before the second group of user contact devices, using the user selected priority information. For example, the present method can be used to contact all first responders in Gulfport, Miss. during a flood, before contacting civilians.

The present method then includes receiving responses from the user contact devices through the two or more industry standard gateways simultaneously and storing the responses in the dynamic information database. The responses can indicate the user contact devices that have received the message. The responses can also indicate when insufficient user contact device information exists to contact one or more user contact devices.

A set of steps can be initiated to request updated user contact information upon receipt of a response.

For example, a user could be contacted on a first priority user contact device by calling the telephone number 713-862-9090. If the telephone number is invalid or erroneous, an error in transmission message can be sent back to the administrator interface and stored in the dynamic information database. The method can then be used to automatically, or upon initiation by an administrator, transmit a request for updated user contact device information, such as "please update your user contact device information", which can be sent to a second user contact device, such as the e-mail address Darren Techradium.com. The user can then update the erroneous telephone number with the replacement telephone number 713-862-9091. It is contemplated that a request for updated user contact information can be transmitted to third and/or fourth user contact devices as well.

In another contemplated embodiment, the user can be permitted to update user contact data from a user contact device at any time.

It is further contemplated that the present method can include receiving a replay response from one or more user contact devices requesting the administrator interface to retransmit a message. For example, the message could prompt the user to "press 1 is the user wants to hear this message again". The method can include retransmitting the message from the administrator interface to one or more of the user contact devices. For example, the administrator interface could have a function which stores messages, which can be sent to the user contact devices repeatedly. The repeated transmission can be based on a predefined interval, or the message can be selectively sent by the administrator when the transmission message is necessary.

In a contemplated embodiment, the present method can include using computer instructions to instruct at least one processor controlling the administrator interface to only transmit one or more messages within a predefined time interval. An administrator can provide a manual override to suppress the processor from complying with the computer instructions, allowing the message to be sent outside of the predefined time interval.

In a contemplated embodiment, the one or more messages can be transformed from a text file to a sound file, such as by using text-to-speech conversion software, such as Nuance™, RealSpeak technology, Microsoft™ text-to-speech software, Speech server, text-to-speech software from AT&T™ Natural Voices™, Loguendo™, or combinations thereof. This embodiment allows users to receive sound messages through a telephone or a contact device having a speaker, which is of great benefit to users who cannot afford computers, cellular telephones, or other devices having textual displays, or to users who live in areas where wireless service or internet access is limited or non-existent. This embodiment is also especially beneficial for enabling users having impaired vision to receive notification in the form of sound messages.

In an embodiment, a language converter, such as Systrans™ or Babel Fish™, or other commercially available language converters, can be used to translate the message to a user contact device in a language selected by the user.

The present method can also include, in an embodiment, providing reporting information for generating a report. Reporting information can include dates and times when one or more messages were sent, dates and times one or more messages were received, content of messages, recipients of one or more messages, recipient information for one or more messages, and combinations thereof. The report can be a customized report, such as a report identifying all user contact devices that have transmitted a response.

In an embodiment, the present method can include using the administrator interface to form new groups of users using user contact data and instruction from the administrator. For example, an administrator need to form new groups of users that include all users living in a specified flood zone, so that messages can be transmitted to this new group of users during an impending hurricane or tropical storm.

The method can also include removing duplicate user contact devices from the user contact data. The duplicate user contact devices can be removed prior to transmitting the one or more messages. For example, a duplicate user contact devices could be a home telephone, where both the husband and wife are users. The duplicate entry of the home telephone number in the dynamic information database can be removed, so that the home telephone is only contacted once for each message transmitted to both the husband and the wife.

Other similar administrative and maintenance functions relating to the information in the dynamic information database are also contemplated.

The present method can also include using a training mode with the administrator interface. The training mode is contemplated to enable administrators to train in use of the present digital notification and response method without transmitting messages. This embodiment is especially beneficial for ensuring that messages are effectively and properly transmitted during times of emergency.

In an embodiment, the present method can include resorting the user contact devices based on administrator selected user contact data, and transmitting a message to the user contact devices that have been resorted. It is contemplated that resorting the user contact devices can include associating one or more user contact devices with different groups, altering the priority information for one or more user contact devices, ordering each user contact device within one or more groups by a selected item of user contact data, such as the type of contact device, and other similar groupings or sortings.

The message transmitted to the resorted user contact devices can indicate any changes that have been made, or the message can indicate only that resorting has occurred.

In a contemplated embodiment, the present method can include transmitting a survey to one or more user contact devices requesting additional information, such as a survey having two or more questions. For example, the survey could ask users about preferences, new features, or satisfaction with the present method. The survey could also collect general information, such as a user's preference regarding one or more political candidates. Responses to the survey can be received and stored in the dynamic information database. Survey responses can be compiled to form a report.

It is also contemplated that the present method can include generating a searchable list of the last message sent to one or more user contact devices in the dynamic information database.

The method can include the step of enabling at least one of the users to transmit a request for message retransmission based on a message time stamp. The message can be sent through one of the industry standard gateways to the dynamic information database. The dynamic information database has computer instructions, which when activated instruct the processor to instantly re-transmit any message sent to the user based on the message time stamp.

The request for retransmission is used after the user emergency message. The processor would look up the user, search messages sent to that particular user, retrieve the last message sent to the user and retransmit or play the message at that moment in time, the moment of the request, without the user having to enter a passcode. This feature is very useful when time is of the essence for the user or the user is injured or in a dangerous situation.

For example, in an emergent situation, such as an impending hurricane about to strike a coastal city, the present method can be used. The administrator interface can be used to prepare and send a message indicating evacuation routes, transportation information, power availability, hurricane preparedness information, and other similar information to a first group of user contact devices. The first group of user contact devices is contemplated to include the user contact device indicated to be a user's preferred first contact device in the user selected priority information.

In an embodiment, the message can first be transmitted to a group of critical users, such as emergency response personnel, which require this information to respond effectively to injuries and persons in need. Critical users can also include vulnerable users that should receive hurricane preparedness information as soon as possible, such as hospitals and nursing homes, or users that should evacuate the area before other users, such as users located in flood zones.

The message can then be transmitted to a second group of user contact devices, optionally, first to contact devices of critical users, then to non-critical users. The transmission of the message to second contact devices maximizes the chance that each user will receive the message.

Each user contact device then transmits a response to the administrator interface upon receipt of the message, verifying that the message was successfully received. The response can include a text response, a voice response, an audio tone file, or a visual response, such as a blinking light. Responses can be stored in the dynamic information database. Messages that do not reach users due to insufficient or invalid contact information can cause error-in-response messages to be generated and stored in the dynamic information database. Users who do not receive the message through any contact devices can be attended to through other means, such as telephone or personal contact by appropriate personnel. Reports can be generated indicating which users have not received the message, so that the users can be contacted through other means, and so that their contact information can be updated.

With reference to the figures, FIG. 1 depicts an embodiment of a digital notification and response system useable with the present method. An administrator (8), such as the chief of a fire department, can transmit one or more messages (6), such as "Due to low humidity this summer, fires will be much more difficult to control. Please be extra cautious regarding the placement of electrical wiring, the storage of flammable materials, and the use of any outdoor grilling equipment," to one or more user contact devices (9a, 9b, and 9c), such as telephones and e-mail addresses of residents in the fire chiefs district, using an administrator interface (4), which can be any type of computer interface in communication with a network.

The administrator (8) can be a person, a computer, an analog emergency notification system, another digital notification and response system, an application programming interface, or other similar devices. The administrator (8) interacts with the administrator interface (4) to begin the process of sending a message to the user contact devices (9a, 9b, and 9c). The administrator interface (4) can be in communication with a local area network, a wide area network, a virtual private network, an asynchronous transfer mode network, a synchronous optical network, a call center interface, a voice mail interface, a satellite network, a wireless network, a WIFI network, a WiMax network, or other similar means useable to transmit a message to numerous contacts.

The message can be a text message, a numerical message, one or more images, an audio message, an audio or video alarm, or a combination of these. The message can be encoded or encrypted. The message can include a designation that identifies the importance the message. Examples of these designations include low priority, general priority, significant priority, high priority, and severe priority. The designations can coincide with the Homeland Security's five-color system. For example, the designations can be color-coded, such as green for a low priority message, blue for a preparedness message or general priority message, yellow for a cautionary message such as a significant priority, orange for an emergency message or a high priority message, or red for a critical message with a severe priority. These priority levels can be customized to represent corporate levels of emergencies, or the priority levels can be tailored to standards relating to a particular industry, such as building owner and manager codes or standards for risks or emergencies in a building.

As seen in FIG. 1, the message (6) is transmitted to one or more user contact devices (9a, 9b, and 9c). Examples of usable user contact devices can include handheld wireless devices, wireless phones, land phones, e-mail addresses, digital displays, LED displays, fax machines, pagers, and similar devices that capable of receiving a message, such as a PDA, a blackberry, or a cellular telephone.

The message (6) is stored on a dynamic information database (12), such as a MySQL™ database. The message can be a prewritten message stored in the dynamic information database for subsequent use by the administrator, or the message can be generated from the dynamic information database (12) based upon inputs from the administrator, and transmitted using the administrator interface.

Figure 2:
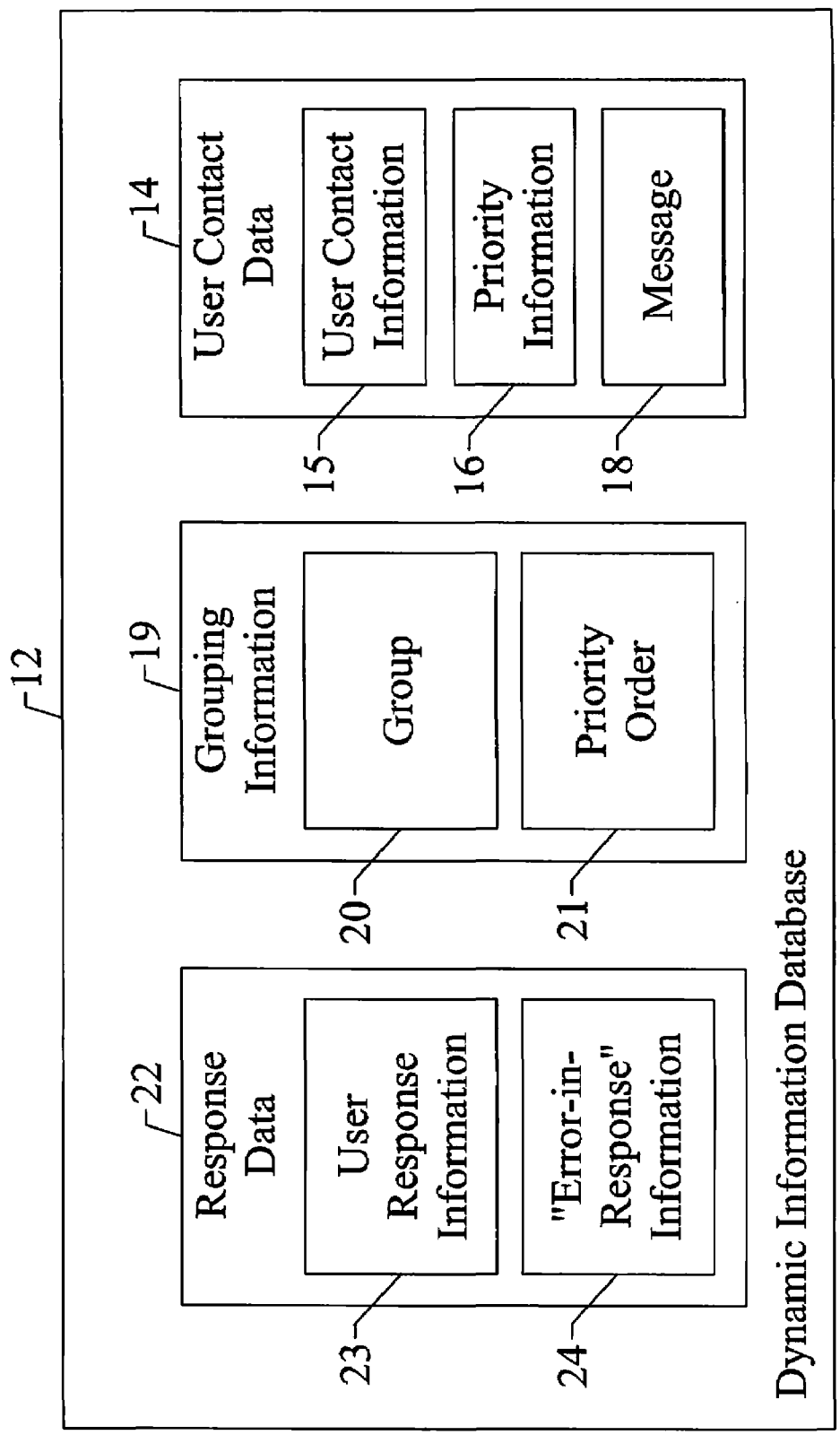
FIG. 2 depicts a representation of an embodiment of a dynamic information database associated with the digital notification and response system of FIG. 1.

FIG. 2 shows a schematic diagram of the dynamic information database (12). The dynamic information database (12) includes three sections: user contact data (14), grouping information (19), and response data (22). The dynamic information database (12) can be a SQL™ database, a MySQL™ database, or other industry standard databases, such as an Oracle™ database.

The user contact data (14) in the dynamic information database (12) includes user contact information (15), priority information (16), and a user selected language for the message (18). The user contact data (14) includes information associated with the user of the user contact device. The user, within the scope of this application, can be any person that can receive a message, send a message, respond to a message, or combinations thereof. Examples of users can include a company, employees of company, an individual, a parent of a child, a fire department, a coach of a youth sports team, a team manager of a youth sports team, the manager of a major league sports team, a sports team representative, a parent of a sports team player, a police department, a commercial property manager, a school system, an adult, a security company, or combinations thereof.

The user contact information (15) includes information concerning both the user contact device and the user. The user contact information (15) can include an e-mail address, an internet protocol (IP) address, a phone number, and combinations thereof. The user contact information (15) can further include the user's name, the user's address, the user's phone number, the user's device address, the user's social security number, an account code, and combinations thereof. Each user contact device can include information that is unique to each individual user contact device or can include information that is common to all user contact devices. For example, the user contact information (15) can include a serial number for a cellular telephone, a mac address for an Ethernet card, or other similar unique identifiers.

The user contact data (14) further includes priority information (16). The priority information (16) is used to indicate a contact order for various user devices of the user. The contact order is used to direct the order in which the dynamic information database (DID) transmits a message to the user contact devices (9a, 9b, and 9c). The priority information (16) can be user selected. It is also contemplated that the priority information (16) can be set by an administrator.

The user contact data (14) can include information beyond the examples listed in order to aid the DID in contacting the user contact devices.

Continuing with FIG. 2, the grouping information (19) in the dynamic information database (12) is used to group users together into separable and identifiable groups for ease of contact by an administrator. The grouping information (19) can include one or more groups (20) associated with the user contact data (14). By grouping the users, the dynamic information database provides the benefit of more efficient delivery of information without having to treat each user individually. Grouping more efficiently defines message recipients, which speeds the delivery of the message.

The grouping information can include a predefined group identified in the dynamic information database. The predefined group can be identified by the administrator or by another user in advance to sending the message. Examples of groupings can include parents of a second grade class, an alumni class from a specific year, members of the Bad News Tigers little league soccer team, all Tuesday night home game subscribers to a certain major league baseball team, executives of a given company, one or more hazmat response teams, and other similar groupings. The grouping information (19) further includes a priority order (21) for contacting a user within the group (20). The priority order directs the administrator interface as to the order in which the administrator interface should contact the individual contact devices with the message. The priority order provides the benefit of ensuring that the most critical users receive the message first, in case time is not available to contact all of the users. The priority order also provides the benefit of ensuring that all users are contacted with equal priority, rather than a discriminating message delivery priority. The priority order guarantees that all users are contacted to on a preferred device first, before a message is transmitted to alternate user contact devices.

The response data (22) in the dynamic information database (12) contains data concerning whether a user contact device and, in turn, a user, received the message. The response data (22) includes user response information (23) that indicates whether a user (17) has received the message. The user response information (23) is gathered by the dynamic information database (12). The response data (22) further includes "error-in-response" information (24), which can indicate when the user contact data (14) is insufficient, and a message can not be delivered properly. The error in response information (24) can also indicate that an email address or phone number is invalid.

Returning to FIG. 1, the administrator (8) can initiate a distribution of one or more messages (6). The system can be initiated automatically. For example, fire alarms, when set off, can automatically alert the system, and then the system can automatically alert and/or advise a user. The system can also be tied to a tracking system, so that if a child misses certain periods of school, the system can advise a parent that the student is missing specific classes.

The system uses the information in the dynamic information database (12) namely the grouping information (19), priority information (16), and the priority order (21), to determine who to contact, and in what order.

The message (6) is transmitted through at least two industry standard gateways (30 and 32) simultaneously. By transmitting the message (6) through numerous gateways, the system provides redundancy in order to ensure the message is relayed to the users. An example of an industry standard gateway can include a SMTP gateway, a SIP, an H.323, an ISDN gateway, a PSTN gateway, a softswitch, or other similar gateways.

The priority order directs the administrator interface (4) to contact a first group of user contact devices (9a), indicated as a first contact. After all of the user contact devices in the first contact have received the message, the priority order directs the administrator interface (4) to contact a second group of user contact devices (9b), indicated as a second contact. Then, the administrator interface (4) continues to contact user contact devices based on the priority order, until all user contact devices are reached. A response can be provided from the user contact devices to ensure receipt of the message.

Once the message is received by a user contact device, the user contact device (9a, 9b, and 9c) can transmit a response back through the industry standard gateways (30 and 32) to the dynamic information database (12). The dynamic information database (12) then stores the responses and the unique address of each user contact device.

In an alternative embodiment, the system can include reporting information for generating reports based upon information in the dynamic information database (12). The reports can be generated by the administrator, the user, a group, or combinations thereof. The reports can include a date the message was sent, such as Mar. 17, 2007, a time the message was sent, such as 8:43 AM, a date the message was received, such as Mar. 17, 2007, a time the message was received, such as 8:46 AM, the content of the message, which can be part of the message or the entire message, a recipient of the message, such as a user's name, recipient information related to the recipient of the message, such as a user telephone number or e-mail address, and combinations thereof. For example, a report can include the name of the person who received the message, a copy of the voice mail, a time when an email was accessed, the time when a fax was printed, and other similar information. An administrator can create custom designed reports, or standard reports can be generated from the dynamic information database for use by the administrator.

In an alternative embodiment, the system can include a language converter, such as Systrans™ or Babelfish™, to translate a text message to second language. The language converter is often referred to as a text translator. For example, the language converter can convert the message from English to a second language, such as Korean, Chinese, Vietnamese, French, English, Spanish, Italian, Norwegian, Swedish, German, Japanese, Russian, or Portuguese. The language converter is beneficial, because not all users speak the same language. The system allows the user to designate a specific language in which to receive the message. The chosen language is stored in the dynamic information database (12) with the user contact data (14).

In an alternative embodiment, the system can include a text-to-sound file converter, such as Microsoft Speech Server™. The text-to-sound file converter can be used to translate a message from text to a sound file. Use of a text-to-sound file converter is beneficial because the transmitted message is consistent, using the same voice, with the same accent, same dynamic, and same delivery speed. The text-to-sound file converter enables individuals with disabilities, namely visual impairment, to also receive the consistent message.

Figure 3:
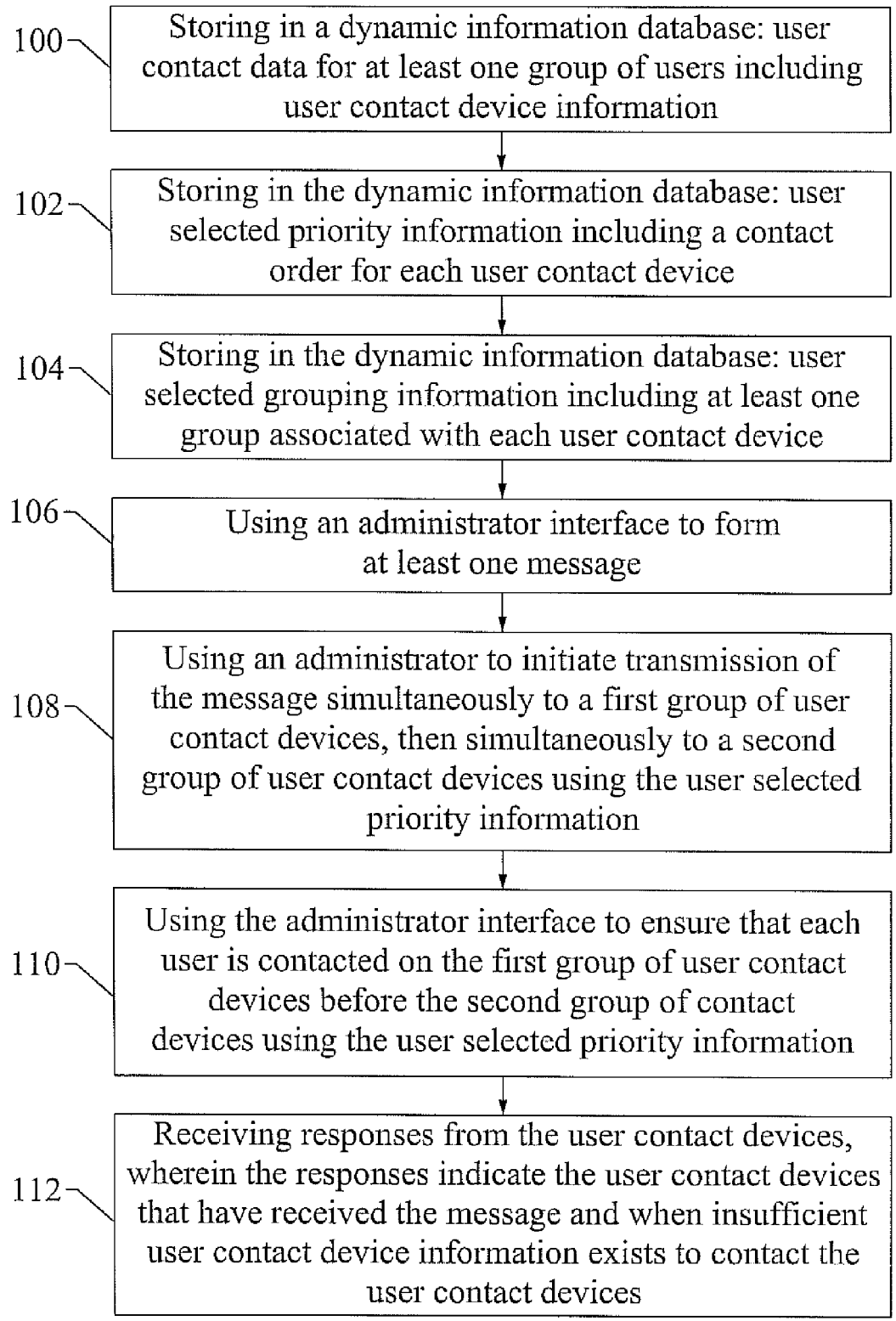
FIG. 3 depicts a flow diagram of an embodiment of the present method.

Referring now to FIG. 3, a flow diagram of an embodiment of the present method is depicted.

The depicted embodiment includes storing in a dynamic information database: user contact data for at least one group of users including user contact device information (100).

User selected priority information including a contact order for each user contact device is also stored in the dynamic information database (102).

User selected grouping information including at least one group associated with each user contact device is further stored in the dynamic information database (104).

An administrator interface is then used to form at least one message (106).

An administrator initiates transmission of the message simultaneously to a first group of user contact devices, then simultaneously to a second group of user contact devices using the user selected priority information (108).

The administrator interface is then used to ensure each user is contacted on the first group of user contact devices before the second group of user contact devices using the user selected priority information (1110).

The depicted embodiment then includes receiving responses from the user contact devices, wherein the responses indicate the user contact devices that have received the message and when insufficient user contact device information exists to contact the user contact devices (112).

The embodiments have been described in detail with particular reference to certain preferred embodiments, thereof, but it will be understood that variations and modifications can be effected within the scope of the embodiments, especially to those skilled in the art.

What is claimed is:

1. A method to provide a digital notification and response to groups of users having at least one contact device comprising:
    storing in a dynamic information database:
        user contact data for at least one group of users, wherein each user in the at least one group has at least one user contact device information;
        user selected priority information that comprises a contact order for each user contact device; and
        user selected grouping information comprising at least one group associated with each user contact device;
    using an administrator interface to form at least one message;
    using an administrator in communication with a processor to initiate transmission of the at least one message simultaneously to a first group of user contact devices for all users in the at least one group of users and then simultaneously to a second group of user contact devices for all users in the at least one group of users using the user selected priority information and transmitting the at least one message through at least two industry standard gateways simultaneously;
    using the administrator interface to ensure each user in the at least one group of users is contacted on the first group of user contact devices before the second group of user contact devices using the user selected priority information; and
    receiving responses from the user contact devices through the at least two industry standard gateways simultaneously by the administrator interface and storing the responses in the dynamic information database, wherein the responses indicate the user contact devices that have received the at least one message and the responses indicate when insufficient user contact device information exists to contact the user contact devices.

2. The method of claim 1, further comprising initiating a set of steps to request updated user contact device information upon receipt of the response.

3. The method of claim 1, further comprising transforming the at least one message from a text file to a sound file.

4. The method of claim 1, further comprising the step of providing reporting information for generating a report.

5. The method of claim 4, wherein the reporting information comprises a date the at least one message was sent, a time the at least one message was sent, a date the at least one message was received, a time the at least one message was received, content of the at least one message, a recipient of the at least one message, recipient information for the at least one message, and combinations thereof.

6. The method of claim 1, wherein the administrator interface communicates with a local area network, a wide area network, a virtual private network, an asynchronous transfer mode network, a synchronous optical network, a call center interface, a voice mail interface, a satellite network, a wireless network, a WIFI network, a WiMax network, or combinations thereof.

7. The method of claim 1, wherein the administrator is a person, a computer, a digital notification and response system, an analog emergency notification system, an application programming interface, a mass notification system, and combinations thereof.

8. The method of claim 1, wherein the at least one message is a prewritten or prerecorded message stored in the dynamic information database for subsequent use by the administrator.

9. The method of claim 1, further comprising the step of permitting the user to update user contact data from the user contact device.

10. The method of claim 1, wherein the dynamic information database is a SQL™ database, a MySQL™ database, an Oracle™ database, another industry standard database, or combinations thereof.

11. The method of claim 1, wherein the user contact data is a member selected from the group consisting of an user name, an user address, an user phone number, an user device address, a social security number, an account code, and combinations thereof.

12. The method of claim 1, wherein the at least one message comprises a designation selected from the group consisting of low priority, general priority, significant priority, high priority, and severe priority.

13. The method of claim 1, further comprising computer instructions in the dynamic information database permitting at least one administrator to be classified and have restricted access to information in the dynamic information database, the administrator interface, or combinations thereof.

14. The method of claim 1, further comprising the step of uploading a document to a website and then using the dynamic information database and the administrator interface to form and transmit a message to at least one group of users, wherein the message comprises the website link to the document.

15. The method of claim 1, wherein the dynamic information database is encrypted.

16. The method of claim 15, wherein the dynamic information database has at least one encryption key.

17. The method of claim 16, further comprising the step of installing the dynamic information database on a solid state hard drive server.

18. The method of claim 1, wherein the at least one group of users is: a police department, a commercial property manager, a company, a parent of a child, a fire department, a school system, an adult, a security company, a donor, an utility customer, a branch of the military, a trade show attendee, a voter, a parishioner, a union organization, at least one union member, or combinations thereof.

19. The method of claim 1, wherein the user contact device is a handheld wireless device, a cellular telephone, a land phone, an e-mail address, a fax machine, a pager, a digital display, a LED display, a webpage, a TTY/TDD device, an instant messaging device, or combinations thereof.

20. The method of claim 1, further comprising creating customized or predefined messages for transmission by the administrator.

21. The method of claim 1, further comprising using a text to sound file converter with the administrative interface to transmit spoken words from the administrator or an agent authorized by the administrator.

22. The method of claim 1, further comprising using a language converter to translate the message to the contact device in a user selected language.

23. The method of claim 5, wherein the reports are customized reports.

24. The method of claim 1, further comprising using the administrator interface to form new groups of users using user contact data and instruction from the administrator.

25. The method of claim 1, wherein the at least one message comprises activation of an audio alarm, a visual alarm, or combinations thereof.

26. The method of claim 1, further comprising the step of removing duplicate user contact devices from the user contact data.

27. The method of claim 1, further comprising using a designated ring tone for each at least one message.

28. The method of claim 7, wherein the application programming interface controls the administrator interface and provides additional code to the administrator interface for creating and transmitting messages to the user contact devices.

29. The method of claim 1, further comprising using a training mode with the administrator interface enabling administrators to train on the notification system without transmitting messages.

30. The method of claim 1, further comprising the step of resorting the user contact devices based on administrator selected user contact data and transmitting a message to the resorted user contact devices.

31. The method of claim 1, further comprising the step of transmitting a survey to the user contact device requesting additional information.

32. The method of claim 31, further comprising the step of receiving a response to the survey and storing the response in the dynamic information database.

33. The method of claim 1, further comprising generating a searchable list of the last message sent to the user contact device in the dynamic information database.

34. The method of claim 1, further comprising the step of using computer instructions to instruct a processor controlling the administrator interface to only transmit the at least one message within a predefined time interval.

35. The method of claim 34, further comprising using a manual override by the administrator to suppress the processor from complying with the computer instructions to transmit the at least one message within the predefined time interval.

36. The method of claim 1, further comprising receiving a replay response from a user contact device requesting the administrator interface to retransmit the at least one message.

37. The method of claim 36, further comprising retransmitting the message from the administrator interface to the user contact device.

\* \* \* \* \*